United States Patent
Eryilmaz et al.

(10) Patent No.: US 7,070,508 B2
(45) Date of Patent: Jul. 4, 2006

(54) CONSTANT VELOCITY FIXED BALL JOINT WITH A MULTI-COMPONENT OUTER JOINT PART

(75) Inventors: Orkan Eryilmaz, Lohmar (DE); Wolfgang Hildebrandt, Siegburg (DE); Thomas Weckerling, Lohmar (DE)

(73) Assignee: GKN Automotive GmbH (DE)

( * ) Notice: Subject to any disclaimer, the term of this patent is extended or adjusted under 35 U.S.C. 154(b) by 163 days.

(21) Appl. No.: 10/478,140

(22) PCT Filed: May 2, 2002

(86) PCT No.: PCT/EP02/04814

§ 371 (c)(1),
(2), (4) Date: Nov. 20, 2003

(87) PCT Pub. No.: WO03/002882

PCT Pub. Date: Jan. 9, 2003

(65) Prior Publication Data

US 2004/0157669 A1    Aug. 12, 2004

(30) Foreign Application Priority Data

Jun. 28, 2001    (DE) ................................ 101 30 859

(51) Int. Cl.
*F16D 3/224*    (2006.01)
(52) U.S. Cl. ........................................ 464/145; 29/428
(58) Field of Classification Search ........ 464/143–146, 464/906; 29/428, 434, DIG. 38
See application file for complete search history.

(56) References Cited

U.S. PATENT DOCUMENTS

| 4,608,028 A | 8/1986 | Welschof et al. |
| 4,950,206 A | 8/1990 | Jacob |
| 5,288,273 A | 2/1994 | Krude |
| 5,290,203 A | 3/1994 | Krude |
| 2002/0094230 A1 * | 7/2002 | Weckerling et al. |

FOREIGN PATENT DOCUMENTS

WO    WO 01/50032 A1    7/2001

OTHER PUBLICATIONS

The American Heritage Dictionary of the English Language, 4th ed., Houghton Mifflin Co., 2000. Retreived from the Internet: URL http://www.yourDictionary.com/ahd/c/c0042900.html.*

* cited by examiner

*Primary Examiner*—Greg Binda

(57) ABSTRACT

A constant velocity fixed ball joint (11) having a longitudinal axis (A), an outer joint part (12) with an annular member (13) and a joint base (14), an inner joint part (23) which is axially supported on the joint base (14), and a cage (17) for receiving the balls (16) and holding the balls (16) in a common plane. The cage (17) is held in both directions on an inner face in the outer joint part (12). The inner joint part (23), in a first direction, is unsupported relative to the cage (17). In a second axial direction towards the joint aperture (26), the inner joint part (23) is indirectly supported via the cage (17) on the outer joint part (12). The cross-section of the inner joint part (23) is smaller than the base aperture in the annular member (13) for the joint base (14).

20 Claims, 6 Drawing Sheets

CONSTANT VELOCITY FIXED BALL JOINT WITH A MULTI-COMPONENT OUTER JOINT PART

BACKGROUND OF THE INVENTION

The invention relates to a constant velocity fixed ball joint having a longitudinal axis and comprising an outer joint part with an annular member and a joint base which is produced separately from, and is connected to, the annular member; an inner joint part which is axially supported at least indirectly on the joint base of the outer joint part; first ball tracks in the outer joint part and second ball tracks in the inner joint part which first ball tracks and second ball tracks are positioned in planes extending through the longitudinal axis and comprise curved center lines; balls which run in pairs of first ball tracks and second ball tracks associated with one another; and a cage with circumferentially distributed cage windows for receiving balls and which holds said balls in a common plane.

In a wider sense, fixed joints of this type are known as Rzeppa fixed joints (RF-joints). In the sense of the present invention, they include, in particular, angular contact joints (AC joints) and undercut-free joints (UF joints). These joints comply with the general requirements of constant velocity ball joints, according to which the curved center lines of the first ball tracks and of the second ball tracks extend symmetrically relative to one another, wherein the plane of symmetry is the plane of the ball centers and, respectively, the angle-bisecting plane between a longitudinal axis of the outer joint part and a longitudinal axis of the inner joint part. One feature of joints of this type is that axial forces occurring under torque build up between the outer joint part and the inner joint part and push the inner joint part into the interior of the outer joint part. Such forces have to be accommodated by the ball cage which, in consequence, is subjected to very high loads.

From DE 42 28 482 A1 it is known to design UF joints in such a way that the inner joint part is directly or indirectly supported on the joint base of the outer joint part.

From DE 42 30 639 A1 it is known to design UF joints with a joint base which is provided in the form of a separate component and on which the inner joint part is supported either directly or indirectly.

In both cases, the joint is assembled entirely from the aperture end of the outer joint part, through which aperture the cage, the balls and the inner joint part are inserted.

SUMMARY OF THE INVENTION

It is an object of the present invention to produce a constant velocity fixed ball joint of said type in a cost-effective way and to provide said joint with improved properties. The objective is achieved by constant velocity ball joints of the initially mentioned type with the following characteristics:

the cage is axially form-fittingly held in both directions in an inner face in the outer joint part, in a first axial direction towards the joint base, the inner joint part is directly support-free relative to the cage, in a second axial direction towards the joint aperture, the inner joint part is indirectly supported exclusively via the cage on the outer joint part, the cross-section of the inner joint part is smaller than the base aperture in the annular member provided for the joint base, the joint base is axially fixed in the base aperture in the annular member.

This design solution is combined with an inventive method of assembling a joint with the above characteristics, comprising the following assembly stages:

the ball cage is inserted into the annular member from the aperture of the joint, the balls are Inserted Into the cage windows (18) from the inside of the ball cage, the inner joint part is introduced into the annular member through the base aperture provided for the joint base, an additional element is inserted into the annular member through the base aperture and made to contact the inner joint part, the joint base is inserted into the annular member, is made to stop against the additional element and is secured in the annular member.

In accordance with this method, the joint base, after having reached said stopping position, can be fixed in the annular part in a play-free way relative to the additional element and, respectively, relative to the inner joint part, or the joint base can initially be axially withdrawn by a defined amount and then secured in the annular member in order to achieve a defined play in the joint.

In particular, it is proposed that the inner aperture of the cage, which is positioned on the side of the joint aperture, is smaller than the cross-section of the inner joint part. As a result the cage is provided with greater strength in the cage half pointing towards the joint aperture, which cage half is subjected to ball forces.

A characteristic feature is that the outer joint part comprises two separate components, i.e. the annular member and the joint base, each of which can be produced in a way involving less deformation than a bell-shaped outer joint part consisting of one piece. As a result of this design, it is possible to achieve an assembly method wherein the inner joint part is coaxially aligned relative to the outer joint part and introduced through the base aperture in the annular member, which base aperture is provided for the joint base. There is thereby achieved an at least indirect axial support for the inner joint part on the joint base (in the joint interior) towards the inside, which indirect axial support is combined with an indirect axial support for the inner joint part via the ball cage on the outer joint part (towards the joint aperture). Within said supporting arrangement, it is also possible to provide a defined play. The load on the ball cage is greatly relieved, in particular, the ball cage will be held free of tensile forces. This type of support arrangement allows an axial assembly with small tolerances because the axial positioning of the joint parts relative to one another is determined by spherical faces between the inner joint part and the cage and between the cage and the outer part, which spherical faces can be produced relatively accurately, whereas the balls are free; this type of support being different from a prior patent application 199 63 653.2 of the Applicant, wherein the assembly of the joint parts relative to one another is also determined by the contact of the balls in the ball grooves whose production requires larger tolerances.

According to one embodiment, the joint base can be centered in the annular member of the outer joint part. For this purpose, it is possible to provide the joint base and the annular member with inter-engaging splines which are inserted into one another, with axial fixing being provided by a beading at the annular member, for example. It is also possible to press hardened splines at one of the two parts into the previously unmachined counter piece and then effect axial fixing.

It is proposed that between the joint base and the inner joint part, there is inserted a supporting disc which forms an internally spherical annular or calotte face in which the inner joint part is supported by means of a spherical face or that between the inner joint part and the joint base, there is positioned an end cap which forms a spherical face which is supported on an internally spherical annular or calotte face of the joint base. If the supporting disc is radially displaceable relative to the joint base or if the end cap is radially displaceable relative to the inner joint part, it is possible to freely and radially set the inner joint part relative to the joint base.

According to another embodiment, it is proposed that, during assembly, the joint base is radially displaceable relative to the inner joint part, with the joint base being able to center itself on the inner joint part, whereupon the joint base is fixed relative to the annular member, in particular by welding the two parts together.

The ball cage, towards the joint base, can comprise a partially internally cylindrical inner face as well as an inner face on the side of the joint aperture, which latter face, in the sense of a wall reinforcement of the cage, is drawn inwardly and takes over an axial supporting function for the inner joint part.

Between the inner joint part and the joint base and, respectively, the intermediate or inserted members, it is proposed that, for play offsetting purposes, there is provided a spring element. The same function can be achieved by providing a greater elasticity of said supporting disc and, respectively, of said end cap.

Because of the predetermined type of assembly, the inner joint part can be produced so as to be seamless and integral with the adjoining shaft because, as a result of the axial assembly, it is possible to eliminate articulation movements during assembly, which could be obstructed by the shaft. The inner joint part can be formed by upsetting the shaft.

In a similar way, the joint base can be produced so as to be integral with the formed-on shaft journal. Said journal can be a solid journal or a hollow journal.

The joint in accordance with the invention has the following advantages:

The joint is assembled in an axially determined way according to which any play and tolerances can be compensated for during assembly, i.e. they are eliminated on the finish-assembled joint. As a result, it may be possible to eliminate hard machining of the ball tracks altogether, and at the same time it may be possible to do without classification of joint components for reducing the amounts of play.

The cage windows can be very short in the circumferential direction because there is no need for an excess length such as it is necessary when over-articulating the joint for the purpose of mounting the balls. The strength of the cage is thus increased.

The joint can be adapted to the different assembly conditions by selecting a joint base with a formed-on shaft journal while retaining the remaining joint components without modifying same. This results in a reduction in the number of parts within the overall assembly.

By separately producing the annular member and joint base with a formed-on shaft journal, it is possible to use new production methods for producing the annular member of the outer joint part, such as plate-metal forming a welded annular member, plate-metal forming a seamless tubular member, chip-forming machining, starting with an annular blank, etc.

By separately producing the annular member and joint base with a formed-on shaft journal, it is possible to use different materials and heat treatment processes for these components, which are adapted to the respective loads, such as a case-hardened annular member together with an induction-hardened shaft journal or a shaft journal consisting of a quenched and tempered material.

The length of the ball cage from the center to the joint base can be reduced considerably because the inner joint part does not have to be axially supported towards the joint base relative to the ball cage.

There is no need for hard-machining the internally cylindrical part of the inner cage face because the ball cage is load-free in this region. It may also be possible to eliminate altogether the process of hardening said halt of the ball cage which is positioned towards the joint base or, optionally, the ball cage can be designed to be weaker in its cross-sectional area, because the cage load conditions are more favorable; in particular, the cage webs are not subjected to tensile loads.

The angle of contact of the ball cage relative to the outer joint part can be reduced on the side of the joint aperture, i.e. the outer joint part can be shortened because the load on the cage, as mentioned above, is much more advantageous and it is acceptable for the support of the ball cage by the guiding face to be reduced. This makes it possible to increase the joint articulation angle or to increase the shaft diameter.

The friction between the inner joint part and the joint base in the region of mutual axial support can be reduced by using means which slide easily, e.g. using a low-friction coating of the inner joint part or by providing a friction-reducing additional element between the inner joint part and the joint base, consisting of a sintered material for example.

There is no need for heat-treating the joint base on its inside if a hard, wear-resistant additional element is used in the joint base. By directly axially supporting the inner joint part on the joint base, the efficiency losses can be reduced.

BRIEF DESCRIPTION OF THE DRAWINGS

Preferred embodiments of the invention will be explained below with reference to the drawings wherein.

DETAILED DESCRIPTION OF THE INVENTION

Figure 1:
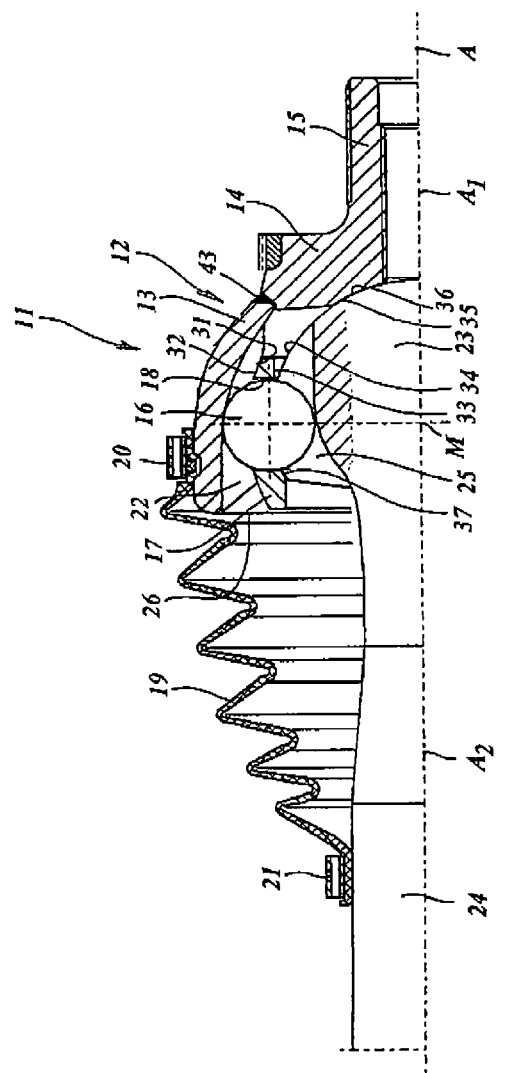
FIG. 1 shows an inventive joint in a first embodiment.

To the extent that FIGS. 1 to 4 correspond to one another in respect of design, they will initially be described jointly.

FIGS. 1 to 4 each show an inventive constant velocity fixed joint 11 with axially undercut-free tracks, i.e. a UF joint. Said joint comprises an outer joint part 12 which is composed of a track-forming annular member 13 and a joint base 14. A shaft journal 15 is integrally formed on to the joint base 14. The axis of the outer joint part has been given the reference symbol A1. Inside the outer joint part 12, there is arranged an inner joint part 23 which is integrally connected to a shaft 24. The axis of the inner joint part has been given the reference symbol A2. When the joint is articulated, the axes A1, A2 form an articulation angle in the joint center M. The outer joint part 12 is provided with first ball tracks 22 and the inner joint part 23 is provided with second ball tracks 25. The first and second ball tracks 22, 25 are positioned in planes extending through the respective axes A1, A2, and include curved center lines. In each of the pairs 22, 25 of ball tracks, there is guided one of the balls 16 which is received by a ball cage 17 in circumferentially distributed cage windows 18. The cage 17 holds the balls in a common plane. The open space between the outer joint part 12 and the shaft 24 is bridged by a convoluted boot 19 which is secured on said parts by clamp bands 20, 21. The annular member 13 of the outer joint part 12 comprises an internally spherical guiding face 31 which is interrupted by the first ball tracks 22 and in which the ball cage 17 is guided by means of an externally spherical outer face 32. There is thus provided a relative axial support between the outer joint part 12 and the ball cage 17. In other words, the cage 17 is axially form-fittingly held in both directions on an inner face 31 of the outer joint part 12. At least as viewed from its central plane, the bail cage 17 comprises a purely cylindrical inner face 33 within which the substantially spherical outer face 34 of the inner joint part 23 is displaceable without being axially supported. The cylindrical inner face 33 is followed, towards the left, by an inner face 37 which is drawn in inwardly and on which the inner joint part 23 is axially supported towards the left. The wall thickness of the cage is increased here. Thus, in the direction towards the joint base 14, the inner joint part 23 is unsupported relative to the cage 17, and towards the aperture 26, the inner joint part 23 is indirectly supported via the cage 17 on the outer joint part 12. In the region of the joint base 14, the outer joint part 13 comprises an internally spherical contact face 35 which is formed directly on to the joint base or on to an intermediate element. A spherical contact face 36 on the inner joint part 23 cooperates with said internally spherical contact face 35 which spherical contact face 36 is either formed directly on to the inner joint part or on to the additional element connected to the inner joint part 23. Thus, the inner joint part 23 is axially supported directly (FIG. 1) by way of a cap 42 (FIG. 3) or disc 40 (FIG. 4) on the joint base 14 of the outer joint part 12. The coinciding axes $A_1$, $A_2$ form the longitudinal axis A of the aligned joint In FIG. 1, the supporting face 35 is directly formed into the joint base 14 and the contact face 36 is directly formed on to the inner joint part 23. The annular member 13 and the joint base 14 are connected to one another by a weld 43. Before the weld 43 is produced, the joint base 14 is axially and radially displaceable relative to the annular member 13, so that it is possible to center the supporting face 35 relative to the inner joint part 23 before the weld 43 is produced.

Figure 2:
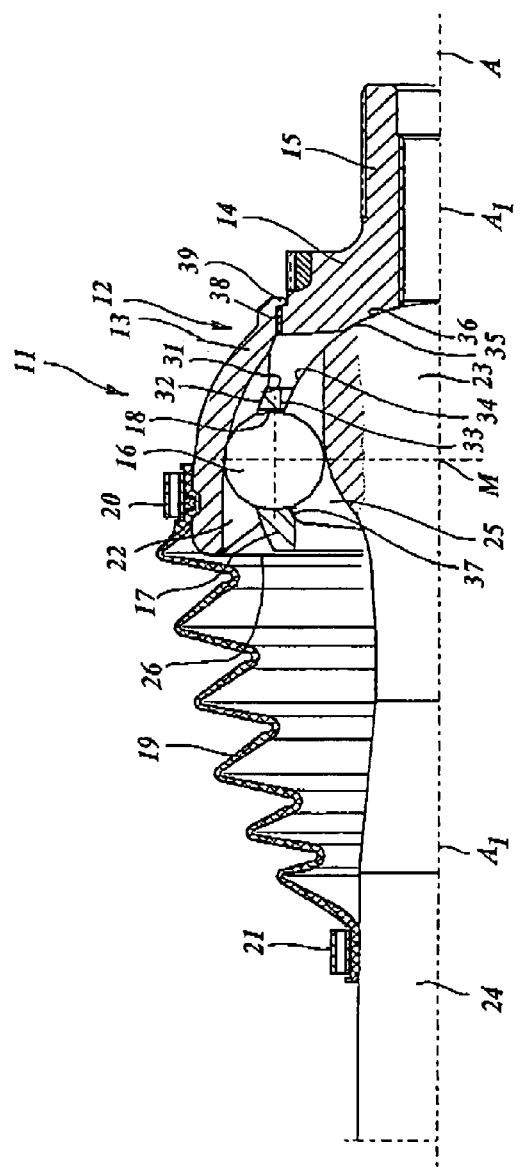
FIG. 2 shows an inventive joint in a second embodiment.

FIG. 2 deviates from FIG. 1 in that the connection between the annular member 13 and the joint base 14 is produced by inter-engaging splines 38 and by a beading 39 provided at the annular member 13 and extending over the joint base 14. The remaining characteristics are identical to those shown in FIG. 1.

Figure 3:
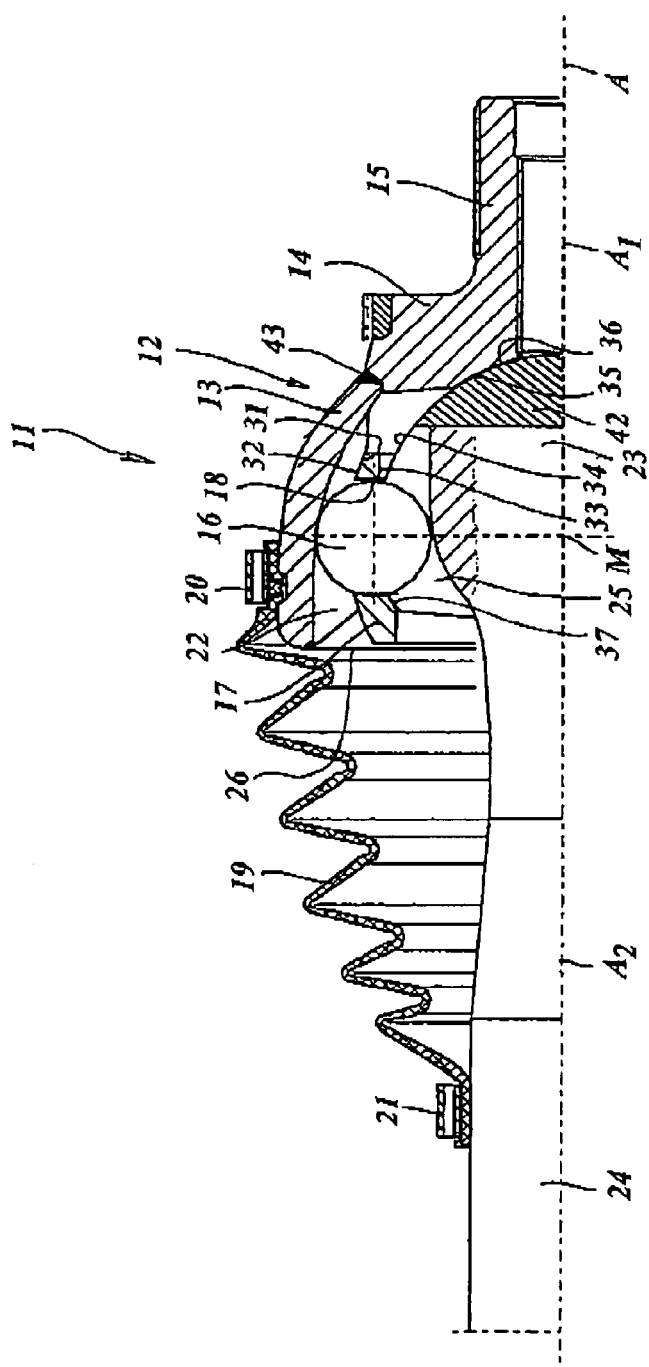
FIG. 3 shows an inventive joint in a third embodiment.

FIG. 3 deviates from FIG. 1 in that an end cap 42 made of a material with good sliding characteristics is attached to the inner joint part 23, with the spherical contact face 36 or calotte face directly formed on to said end cap 42. The end cap 42 can be radially displaceable relative to the inner joint part 23; it can also comprise a material with a greater elasticity, so that it simultaneously acts as a spring element for offsetting play and wear. The remaining details are fully identical to those shown in FIG. 1.

Figure 4:
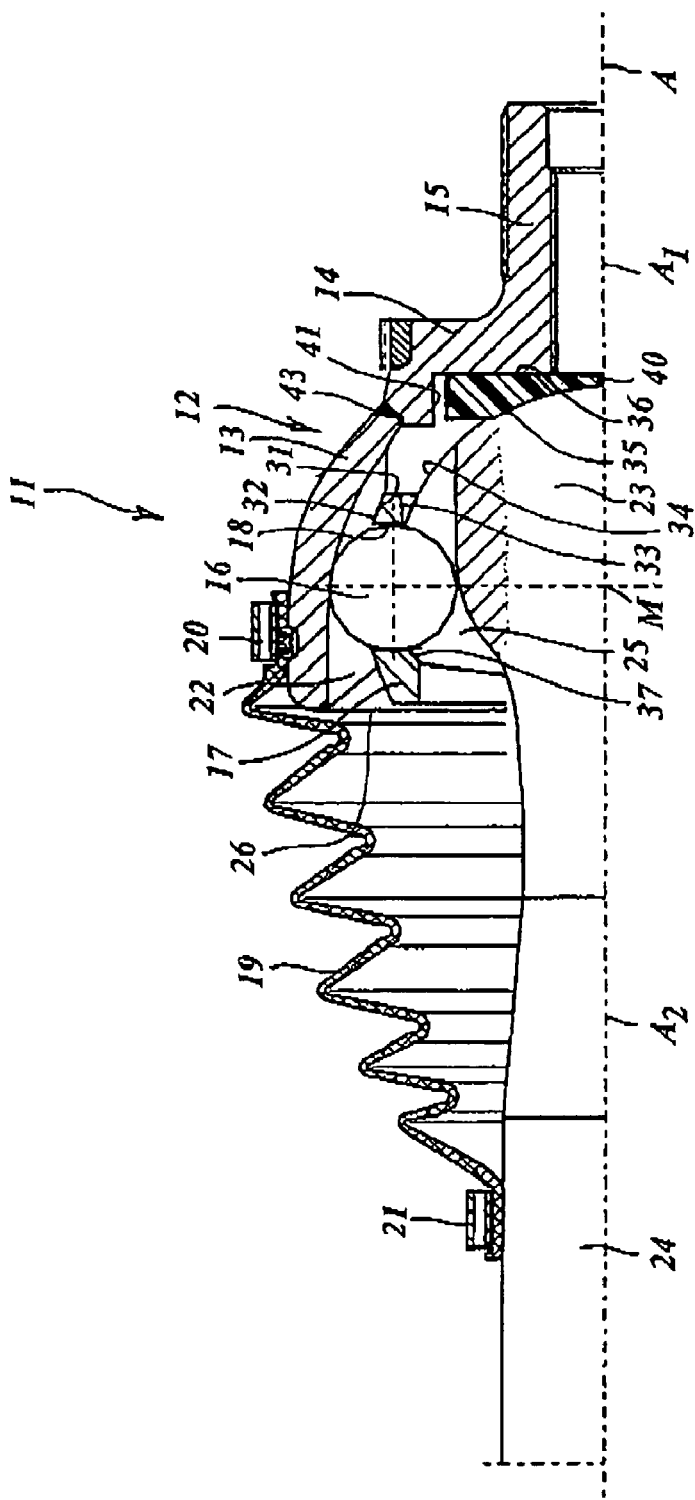
FIG. 4 shows an inventive joint in a fourth embodiment.

FIG. 4 deviates from FIG. 1 in that a supporting disc 40 comprising a material with good sliding properties is inserted into the joint base 14, with the supporting face 35 or calotte face being directly formed into said supporting disc 40. The supporting disc 40 is radially displaceable in a recess 41 in the joint base 14, so that there exists a second possibility of centering the supporting face 35 relative to the inner joint part. The supporting disc 40, too, can comprise a material with a greater elasticity, so that ft simultaneously acts as a spring element for offsetting play and wear. The remaining details correspond fully with those shown in FIG. 1.

The assembly sequence of the joint 11 will again be explained with reference to FIG. 5. The design of the joint according to FIG. 5 fully corresponds to the joint design of FIG. 1, so that the same reference numbers are used for the joint components. Before assembly starts, the annular member 13 and the joint base 14 are separate from one another. Assembly starts from the annular member 13 into which there is inserted the ball cage 17. This can be done with the parts being in a coaxial position relative to one another, with the regions of the guiding face 31 between the first ball tracks 22 engaging the cut-outs of the cage windows 18 and with the ball cage 17, after having been introduced, being rotated by half the distance between two tracks. Thereafter, the balls 16 are introduced in particular from the larger aperture end of the annular member 13 and from the inside of the ball cage 17 into the cage windows 18 and into the respective first ball tracks 22. Thereafter, from the smaller aperture end of the annular member 13, the inner joint part 23 with the integrally formed-on shaft 24 is coaxially introduced into the pre-assembled unit comprising the annular member 13, the balls 16 and the ball cage 17, so that the balls 16 engage the inner ball tracks 25.

The inner joint part 23 is displaced in the direction towards the joint aperture 26 until the ball tracks 25 are in contact with the balls 16 and the balls 16 are in contact with the faces inside the cage windows 18 towards the joint aperture. Axial assembly is enabled because the inner aperture of the cage 17, on the side of the joint aperture 26 is smaller than the cross-section of the inner joint part 23. The ball cage 17 is axially supported on the internally spherical guiding face 31. Now the joint base 14 with the formed-on shaft journal 15 is introduced into the annular member 13 and made to stop against the inner joint part 23. Hereafter and in this position or after the joint base 14 has been withdrawn slightly by a pre-determined axial amount of joint play, the joint base 14 is welded to the annular member 13 in the way as shown.

Figure 5A:
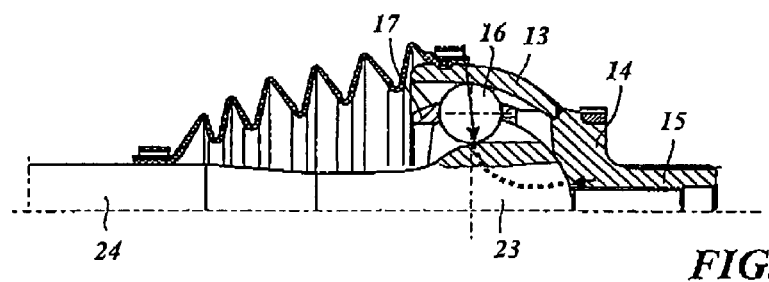
FIG. 5 illustrates the introduction of force at a joint in accordance with the invention:
  a) at the inner joint part
  b) at the ball cage
  c) at the outer joint part.
Figure 5B:
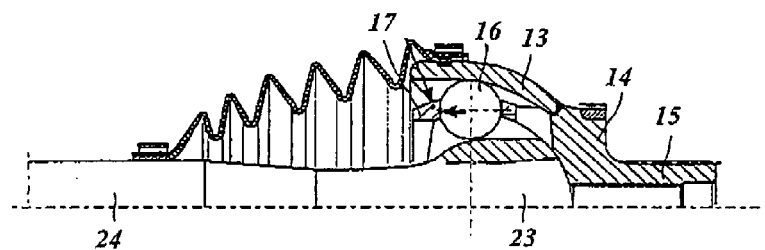
Figure 5C:
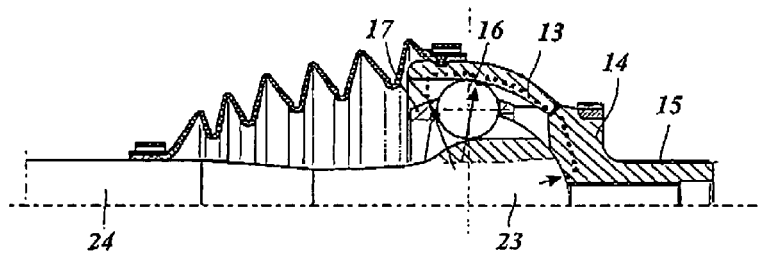

In FIG. 5 a), the forces acting on to the inner joint part from the outside are indicated by arrows and the flow of force in the inner joint part 23 is indicated by a dashed line. This shows that the inner joint part 23 is supported towards the joint base 14 in a first axial direction on the joint base 14 and is supported in the opposite second axial direction towards the joint aperture 26 on the balls 16.

In FIG. 5 b), the forces acting from the outside on the ball cage 17 are indicated by arrows, i.e. the forces applied by the balls 16 at the faces of the cage windows 18 towards the joint aperture and the forces with an opposed axial component applied by the inner guiding face 31 in the annular member 13 to the outer face 32.

In FIG. 5 c), the forces applied to the outer joint part 12 are indicated by arrows, i.e. the forces applied by the inner joint part 23 to the joint base 14, by the ball cage 17 to the inner guiding face 31 and by the balls 16 to the first ball tracks 22. The inner flow of force between said forces in the outer joint part 12 is indicated by a dashed line.

All three illustrations are based on the assumption that the joint is subjected to a normal torque load. Because of their shape, the ball tracks apply to the balls a resulting force to the left, as a result of which, with the outer joint part being assumed to be fixed, the inner joint part is subjected to resulting force to the right, so that the inner joint part is supported on the base of the outer joint part.

Figure 6A:
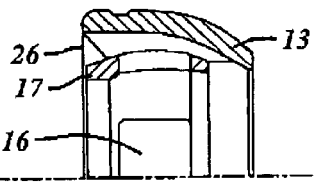
FIGS. 6A–6E show one example of an assembly sequence for the joint of FIG. 4 according to a method of the present invention.
Figure 6B:
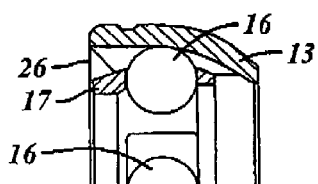
Figure 6C:
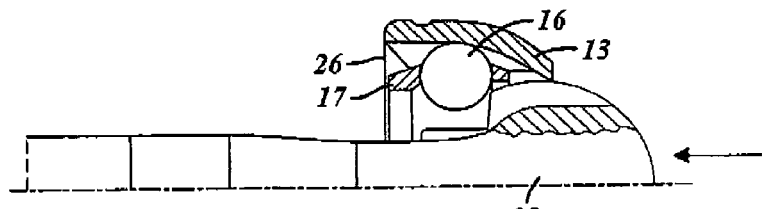
Figure 6D:
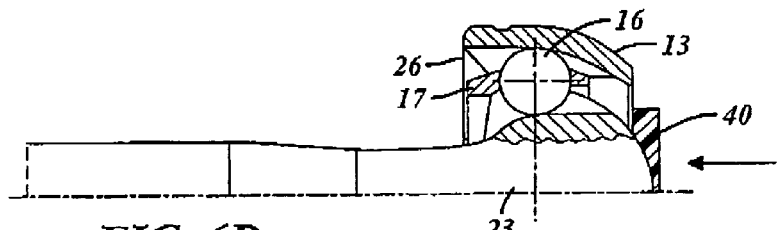
Figure 6E:
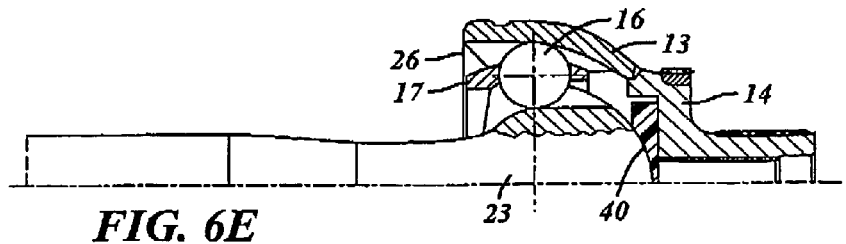

FIGS. 6A–6E show one example of an assembly sequence for the joint of FIG. 4. In FIG. 6A, the ball cage 17 is inserted into the annular member 13 from the joint aperture 26. In FIG. 6B, the balls 16 are inserted into the cage windows 18 from inside the ball cage 17. In FIG. 6C, the inner joint part 23 is introduced into the annular member 13 through the base aperture provide for the joint base 14. Optionally, in FIG. 6D, an additional element such as the cap 42 (FIG. 3) or disc 40 (FIG. 4) can be inserted into the annular member 13 through the base aperture for the joint base 14. In FIG. 6E, the joint base 14 is inserted into the annular member 13, stopping the joint base 14 against the inner joint part 23, or additional element 40, 42 associated with the inner joint part 23. The base 14 can then be secured to the annular member 13, or withdrawn by a defined amount prior to securing to allow for axial play.

The invention claimed is:

1. A constant velocity fixed ball joint (11) having a longitudinal axis (A) and comprising:
   an outer joint part (12) with an annular member (13) and a joint base (14) which is produced separately from, and is connected to, the annular member (13);
   an inner joint part (23) which is axially supported directly or by way of a cap (42) or disc (40) on the joint base (14) of the outer joint part (12);
   first ball tracks (22) in the outer joint part (12) and second ball tracks (25) in the inner joint part (23) which first ball tracks and second ball tracks (22, 25) are positioned in planes extending through the longitudinal axis (A) and which comprise curved center lines;
   balls (16) which run in pairs of first ball tracks (22) and second ball tracks (25) associated with one another said pairs of first ball tracks (22) and second ball tracks (25) widening towards a joint aperture (26) axially opposite the joint base (14);
   a cage (17) which comprises circumferentially distributed cage windows (18) for receiving balls (16) and which holds said balls (16) in a common plane,
   wherein the cage (17) is axially form-fittingly held in both directions in an inner face in the outer joint part (12),
   and wherein, in a first axial direction towards the joint base (14), the inner joint part (23) is unsupported relative to the cage (17), and in a second axial direction towards the joint aperture (26), the inner joint part (23) is indirectly supported via the cage (17) on the outer joint part (12),
   and wherein the cross-section of the inner joint part (23) is smaller than a base aperture in the annular member (13) provided for the joint base (14),
   and wherein the joint base (14) is fixed in the base aperture in the annular member (13).

2. A joint according to claim 1, wherein an inner aperture of the cage (17), which is positioned on the side of the joint aperture (26), is smaller than the cross-section of the inner joint part (23).

3. A joint according to claim 1 wherein, between the joint base (14) and the inner joint part (23), there is positioned a supporting disc (40) which forms an internally spherical annular face (35) in which the inner joint part (23) is supported by a spherical face (36).

4. A joint according to claim 3, wherein that the supporting disc (40) is radially displaceable relative to the longitudinal axis (A) in the joint base (14).

5. A joint according to claim 1 wherein, prior to assembly, the joint base (14) comprises radial play relative to the annular member (13), and is fixed in the annular member (13) so as to be centered on the inner joint part (23).

6. A joint according to claim 1 wherein the joint base (14) is welded to the annular member (13).

7. A joint according to claim 1 wherein the joint base (14) is centered with respect to the annular member (13) by inter-engaging shaft splines (38).

8. A joint according to claim 7, wherein the joint base (14) is axially fixed to the annular member (13) by a beading (39).

9. A joint according to claim 1 wherein the inner joint part (23) Includes a spherical face (36) directly formed thereon, and is supported on an internally spherical annular face (35) of the joint base (14).

10. A joint according to claim 1 wherein between the inner joint part (23) and the joint base (14), there is arranged an end cap (42) which forms a spherical face (36) which is supported on an internally spherical annular face (35) of the joint base (14).

11. A joint according to claim 10, wherein the end cap (42) is radially displaceable relative to the longitudinal axis (A) with respect to the inner joint part (23).

12. A joint according to claim 1 wherein, towards the joint base (14), the ball cage (17) comprises an internally cylindrical inner face (33) and, on the side of the joint aperture (26), comprises an inner face (37) which is drawn in inwardly to form a wall thickening of the ball cage (17).

13. A joint according to claim 1 wherein a journal (15) is integrally connected to the joint base (14).

14. A joint according to claim 1 wherein a shaft (24) is integrally connected to the inner joint part (23).

15. A joint according to claim 1 comprising an axial spring mechanism (40, 42) between the joint base (14) and the inner joint part (23).

16. A joint according to claim 1 comprising a friction-reducing element (40, 42) between the faces in the region where the inner joint part (23) and the joint base (14) mutually support one another.

17. A method of assembling a joint according to claim 1, comprising the steps of:
   inserting the ball cage (17) into the annular member (13) from the joint aperture (26) of the joint;
   inserting the balls (16) into the cage windows (18) from the inside of the ball cage (17);
   introducing the inner joint part (23) into the annular member (13) through a base aperture provided for the joint base (14),
   inserting an additional element (42) into the annular member (13) through the base aperture so as to contact the inner joint part (23); and inserting the joint base (14) into the annular member (13), stopping the joint base (14) against the additional element (42), and securing the joint base (14) in the annular member (13).

18. A method of assembling a joint according to claim 1, comprising the steps of:
inserting the ball cage (17) into the annular member (13) from the joint aperture (26) of the joint;
inserting the balls (16) into the cage windows (18) from the inside of the ball cage (17);
introducing the inner joint part (23) into the annular member (13) through a base aperture provided for the joint base (14);
inserting an additional element (42) into the annular member (13) through the base aperture so as to contact the inner joint part (23); and
inserting the joint base (14) into the annular member (13), stopping the joint base (14) against the additional element (42), withdrawing the joint base (14) by a defined amount of axial play, and securing the joint base (14) in the annular member (13).

19. A method of assembling a joint according to claim 1, comprising the steps of:
inserting the ball cage (17) into the annular member (13) from the joint aperture (26) of the joint;
inserting the balls (16) into the cage windows (18) from the inside of the ball cage (17);
introducing the inner joint part (23) into the annular member (13) through a base aperture provided for the joint base (14); and
inserting the joint base (14) into the annular member (13), stopping the joint base (14) against the inner joint part (23), and securing the joint base (14) in the annular member (13).

20. A method of assembling a joint according to claim 1, comprising the steps of:
inserting the ball cage (17) into the annular member (13) from the joint aperture (26) of the joint;
inserting the balls (16) into the cage windows (18) from the inside of the ball cage (17);
introducing the inner joint part (23) into the annular member (13) through a base aperture provided for the joint base (14); and
inserting the joint base (14) into the annular member (13), stopping the joint base (14) against the inner joint part (23), withdrawing the joint base (14) by a defined amount of axial play, and securing the joint base (14) in the annular member (13).

* * * * *

UNITED STATES PATENT AND TRADEMARK OFFICE
CERTIFICATE OF CORRECTION

PATENT NO. : 7,070,508 B2  Page 1 of 1
APPLICATION NO. : 10/478140
DATED : July 4, 2006
INVENTOR(S) : Orkan Eryilmaz, Wolfgang Hidebrandt and Thomas Weckerling It is certified that error appears in the above-identified patent and that said Letters Patent is hereby corrected as shown below:

In the Abstract: title page (57)
Line 4, should read as follows: -- axially supported on the joint base (14), balls (16), and a cage (17) for --

Claim 9:
Column 8, Line 27, should reads as follows: -- (23) includes a spherical face (36) directly formed thereon, --

Signed and Sealed this

Fifth Day of September, 2006

JON W. DUDAS
*Director of the United States Patent and Trademark Office*